United States Patent Office 3,255,148
Patented June 7, 1966

3,255,148
PROCESS OF PIGMENTING POLYAMIDES
Frederic L. Sievenpiper, Alden, N.Y., William G. Reveley, Stillwater, Minn., and Alvin J. Sweet, Petersburg, Va., assignors to Allied Chemical Corporation, New York, N.Y., a corporation of New York
No Drawing. Filed Mar. 19, 1959, Ser. No. 800,403
7 Claims. (Cl. 260—37)

This invention relates to the pigmentation of superpolyamides, especially nylon, e.g. polymerized caprolactam.

Much research effort has been devoted to improving the pigmentation of fiber-forming polyamides since the introduction of these useful materials. Attempts to color polyamides by incorporation in the molten polyamide of dispersions of pigments in extremely fine form frequently result in uneven colorations due to the formation of localized "pockets" or aggregates of pigment in the polyamide resin. The suggestion has been made to apply the pigment in finely powdered form to particles of the resin, then melt the surface pigmented particles and extrude or mold the colored melt to produce pigmented resin particles. Such procedures usually result in non-uniform colorations due to the formation of pigment aggregates and generally uneven distribution of pigment. This non-uniformity of color is aggravated by the variations in density between the particles of pigment and the polyamide.

The suggestion has also been made to effect coloration by incorporating a heat-stable dyestuff in the polyamide polymerization mixture. In view of the relatively high temperature required for the polymerization and the degrading effect of the polyamides on most organic pigments, this procedure has not met with success in the preparation of pigmented products. It is unsuitable for the preparation of superpolyamides which require long polymerization times at high temperatures to obtain the desired average molecular weight suitable for fiber-forming products.

Attempts to produce spun dyed fibers characterized by fastness properties (to light, washing, organic solvents, etc.) by the spin formation of the fibers from pigmented polyamide resins heretofore available have proved unsatisfactory chiefly because the use of such pigmented polyamide resins generally results in adverse effect of the pigments on the tensile properties of the fibers and lack of uniformity of shade in the spun dyed fibers. These defects result no doubt from the inability of the fabricator to obtain a satisfactory dispersion of pigment in the superpolyamide. They may also be attributable to lack of uniformity of the pigment due to decomposition resulting from contact with the polyamide at the high temperatures required by the polymerization in those cases where the pigmented polyamide is produced by incorporating the pigment in the polymerization mixture before polymerization takes place.

It is among the objects of the present invention to provide a process for pigmenting superpolyamides resulting in the production of pigmented polyamides suitable for use in the manufacture of spun dyed synthetic fibers.

Another object of this invention is to provide a process of producing pigmented superpolyamides which are stable, free from aggregates, uniform in color and suitable for use as a master coloring batch.

Another object of this invention is to provide a pigmented superpolyamide in which the pigment is evenly dispersed throughout the finely divided superpolyamide particles with the pigment particles the inner phase and the polyamide resin the outer phase.

These objects and other advantages incidental thereto will be apparent from the following description of the present invention.

This invention is applicable to the production of all superpolyamides including nylon (e.g., hexamethylene adipamide [nylon 66], polycaprolactam [nylon 6], and other superpolyamides including those mentioned in United States Patent 2,345,533 of March 28, 1944).

In accordance with the present invention superpolyamides are pigmented by heating a mixture comprising an aqueous dispersion of the pigment, the superpolyamide, water and an organic liquid, which is chemically inert to the polyamide and conditions the polyamide, e.g. functions as a softening agent or forms a solvate, so that the polyamide melts at a lower temperature than would be the case in the absence of the organic liquid. The organic liquid can be mixed with the other ingredients of the mixture as preferred or can be added to the pigmented polyamide produced by heating a mixture of aqueous dispersion of pigment, water and polyamide. The mixture is heated to a temperature at which the polyamide is molten but below the temperature at which substantial decomposition of the polyamide takes place. The heating is continued until the pigment is substantially completely transferred from the aqueous phase into the molten polyamide. The mixture is then cooled while subjected to agitation; upon cooling, solid pigmented polyamide particles result. The thus pigmented polyamide particles are separated from the mixture and dried. They constitute the desired pigmented polyamide particles in which the pigment is in the inner phase and the polyamide is in the outer phase.

The organic liquid employed can be a monohydric aliphatic alcohol containing from 1 to 6 carbon atoms such as methanol, ethanol, tertiary butanol, isoamyl alcohol or n-hexanol; an alicyclic alcohol such as methylcyclopentanol or cyclohexanol; a polyhydric alcohol such as ethylene glycol, propylene glycol, triethylene glycol, quinitol (cyclohexane-1,4-diol), 1,3-butanediol, 1,5-pentanediol or glycerin; a ketone such as acetone, cyclohexanone, methylcyclopentanone or methylisobutyl ketone; or a mixture of such alcohols including the polyhydric alcohols and/or ketones.

Inorganic and organic pigments can be used in pigmenting the polyamide. Typical inorganic pigments are cadmium selenides, iron oxides, ultramarine blues, chrome yellows, zinc oxides and lithopones, antimony oxides, and carbon black.

Examples of organic pigments are phthalocyanine blues and greens, vat dyestuffs, heteropoly acid lakes, Patent blues, Hansa yellows, and lithol reds.

Mixtures of these and other pigments can, of course, be used in pigmenting the polyamide.

Wet pigment filter cakes can be used in practicing this invention. The use of such wet pigment filter cakes or aqueous pigment press cakes makes possible utilization of the pigment in finely divided dispersed form, eliminating agglomeration of pigment particles which inevitably takes place when the wet filter cake or press cake is subjected to drying.

The amount of pigment used will, of course, depend on the desired color or shade; in general, from 0.001 to 2.0 parts by weight of pigment based on the weight of polyamide produces satisfactory colorations.

The amount of water mixed with the polyamide is from 2 to 10 parts by weight based on the weight of the polyamide, in general.

The amount of organic liquid relative to that of the water will depend on the desired fineness of the particle size of the pigmented polyamide. The type of organic liquid used also affects the particle size. For example, ketones, in general, give finer particles than the mono- or polyhydric alcohols. The greater the relative quantity of water in the mix, the coarser the particle size. In general, the use of an amount of organic liquid of between about 20% and about 50% by weight relative to the weight of water produces satisfactory pigmented polyamides, which when dried are free-flowing and of satisfactory particle size.

The process is carried out by heating the mixture of pigment, water, organic liquid and polyamide in an inert atmosphere, while agitating the mixture. After the mixture is introduced into an autoclave or other closed vessel, residual air preferably is removed by boiling or passing inert gas through the vapor space to effect such removal. The heating of the mixture can be carried out under a blanket of nitrogen or carbon dioxide to provide the desired inert atmosphere, particularly in those cases where the volume of the charge is inadequate to displace substantially all air in the vessel. While it is preferred to heat all constituents together, the process can be carried out by heating the aqueous dispersion of pigment, water and polyamide to effect pigmentation of the polyamide, then mixing the pigmented polyamide with the organic liquid and reheating, and thereafter cooling while agitating to effect separation of the pigmented polyamide particles.

The mixture is heated to a temperature at which the polyamide is molten but not exceeding 180° C., i.e. to a temperature below which substantial decomposition of the polyamide takes place. In general, the temperature should be at least about 125° C., preferably 135° C., and, as noted, not higher than 180° C. The minimum temperature will, of course, depend on the temperature at which the polyamide treated is molten; the higher the average molecular weight of the polyamide, the higher the temperature to which the mixture is heated. This temperature differs for different polyamides. During this heating the mixture is agitated and maintained at this temperature, for a period of time long enough to permit substantially all of the pigment to migrate from the aqueous dispersion phase into the molten polyamide phase. Usually about 1 hour or even less is adequate. Thereafter the mixture is cooled while being agitated. The suspension of pigmented resin particles thus produced is separated from the aqueous phase in any convenient manner, as by filtration, and dried.

The pressure under which the mixture is heated can be that developed at the operating temperature; higher pressures can be used if desired. In general, operating pressures within the range of from 35 to 100 p.s.i.g. are employed, thus avoiding the necessity of using expensive equipment capable of withstanding appreciably higher pressures.

There is an interrelationship between the temperature to which the polyamide is heated, the nature of the organic liquid used, the rate of agitation employed during the heating and subsequent cooling, and the ratio of water to organic liquid. The combination of conditions should be so chosen as to produce the desired pigmentation of the polyamide in a desired particle size. Optimum practical conditions can readily be determined by a few trial experiments.

Surprisingly, the polymer properties, such as tensile strength and ultimate elongation, are not altered significantly by the pigmentation in accordance with the present invention. The pigmented polyamide can be blended with uncolored polyamide to obtain a complete range of tints. The blends, when melted and extruded or molded, produce products devoid of mottled effects.

The reasons for the present invention resulting in the pigmentation of the polyamide with the polyamide in the outer phase, the pigment in the inner phase and in finely divided particle size, are not fully understood. The presence of the water results in the polyamide becoming molten at a lower temperature than would be the case in the absence of the water. The addition of the organic liquid effects a further lowering of the temperature at which the polyamide melts, and thus cooperates with the water in this respect. The organic liquid also has a softening effect on the polyamide. Hence, the combined action of the water and organic liquid enables the process to be operated at temperatures well below that at which the polyamide depolymerizes. Moreover, the organic liquid appears to assist in the emulsification of the molten polyamide in the aqueous mixture upon agitation of the mixture. Hence, upon cooling while agitating, the pigmented polyamide is obtained in a fine state of subdivision with the pigment the inner phase in the polyamide. That the pigment is firmly fixed within the polyamide particles, i.e. in the inner phase, is evident from the fact that, when the particles are rubbed between the fingers, no color adheres to the skin.

The pigmented polyamide particles, produced by the process of this invention, are substantially free from pigment aggregates and are in a form which is suitable for use as a master batch for blending with unpigmented polyamide resins and the blend used for extrusion, molding, etc., producing products devoid of mottled effects.

The pigmented polyamide particles, as such or blended with unpigmented polyamide, can be rendered molten and the molten mass passed through spinnerets to produce spun dyed nylon fiber. Surprisingly, when the pigment is introduced into the polyamide in accordance with the process of this invention, it has no appreciable adverse effect on the tensile properties of the fiber. The spun dyed fibers are uniform in shade. By proper selection of pigmented polyamide, spun dyed fibers of any desired color or shade can be produced.

The following examples are illustrative of the process of the present invention. It will be understood the invention is not limited to these examples. In the examples, parts are by weight and temperatures are given in ° C.

EXAMPLE I

A. *Preparation of color dispersion*

A mixture of 1070 parts of aqueous press cake containing 200 parts of 100% Carbansol Golden Orange 3G (CI Pr 290), diluted to 4000 parts with water and 20 parts of sodium salt of the condensation product of formaldehyde and naphthalene $\beta$-sulfonic acid is dispersed in a Kady mill for 4 hours.

B. *Preparation of nylon master pigment batch*

A mixture of 860 parts of the color dispersion prepared in "A" above, 1100 parts of water, 2000 parts of ethanol and 760 parts of nylon (polycaprolactam) is heated in an autoclave at 135° to 140° for 1 hour. The charge displaced substantially all of the air in the autoclave, thus producing the desired inert atmosphere. The mixture is agitated while being cooled to ambient temperature, the finely divided pigmented nylon particles separated by filtration, and dried at 60° to 70°.

The pigmented nylon is mixed with nine times its weight of unpigmented nylon and the mixture is extruded as a ribbon characterized by evenness of coloration. The shade is deeper and more uniform than that obtained from nylon coated on the surface with a like amount of pigment (by tumbling the nylon particles mixed with the powdered color) and extruding the thus surface-pigmented nylon to produce a ribbon.

EXAMPLE I-a

This example differs from Example I chiefly in the use of cyclohexanol instead of the ethanol; otherwise the conditions are the same. Pigmented nylon particles are thus produced characterized by evenness of coloration.

EXAMPLE I-b

This example differs from Example I in that propylene glycol is used instead of the ethanol. Pigmented nylon particles, evenly colored, are produced.

EXAMPLE I-c

This example differs from Example I in that acetone is used instead of the alcohol. Evenly colored pigmented nylon particles are produced.

EXAMPLE II

A mixture consisting of 2230 parts of deaerated water, 572 parts of Aquablack B (containing 200 parts of carbon black), 1150 parts of n-hexanol and 400 parts of nylon is placed in an autoclave and the air space is flushed with nitrogen. The mixture is heated at 120° for one hour and at 135° to 140° for ½ hour. Thereafter the mass is cooled, the finely divided pigmented polyamide particles separated by filtration, and dried.

The product is extruded in ribbon form and shows by microscopic examination that the pigment dispersion is good.

When this process is repeated employing nylon 66, a similarly satisfactory pigmented polyamide is obtained.

EXAMPLE II–a

This example differs from Example II in that cyclohexanol is used instead of the n-hexanol. Uniformly pigmented nylon particles result.

EXAMPLE II–b

This example differs from Example II in that triethylene glycol is substituted for the n-hexanol. Uniformly pigmented nylon particles result.

EXAMPLE II–c

This example differs from Example II in that methylcyclopentanol is substituted for the n-hexanol. Uniformly pigmented nylon particles result.

EXAMPLE III

A mixture consisting of 785 parts of nylon, 320 parts of dibromoindanthrone (containing 40 parts of color solids), 2720 parts of water and 1000 parts of cyclohexanone is heated in an autoclave for 1 hour at 120° and for ½ hour at 140° to 145°. The atmosphere is inert, the charge displacing substantially all of the air in the autoclave. The mass is agitated while being cooled to ambient temperature. The resulting suspension of pigmented particles is filtered and dried.

A solution of the product in formic acid when examined under the microscope showed the dispersion of pigment to be very good.

EXAMPLE III–a

This example differs from Example III in that isoamyl alcohol is used instead of the cyclohexanone. Uniformly colored nylon particles result.

EXAMPLE III–b

This example differs from Example III in that methylcyclopentanol is used instead of the cyclohexanone. Uniformly colored nylon particles result.

EXAMPLE III–c

This example differs from Example III in that glycerin is used instead of the cyclohexanone. Uniformly colored nylon particles result.

EXAMPLE III–d

This example differs from Example III in that methyl ethyl ketone is used instead of cyclohexanone. Uniformly pigmented nylon particles are produced.

EXAMPLE IV

To an autoclave of 1000 parts capacity, 200 parts of nylon molding powder, 135 parts of Aquablack (an aqueous dispersion of carbon black containing 35% carbon, a product of Columbia Carbon Co.) is added and the mixture diluted with water to the effective capacity of the autoclave. The mixture is heated at 160° to 165° for 3 hours (air being bled off at 100°). The mass is cooled while being stirred. The resultant mixture is a viscous mass containing large chunks of pigmented resin which cannot be broken up by repeated heating and cooling.

The aqueous phase is decanted from the solid phase and replaced by an equal volume of a 50% ethanol solution. The batch is reheated to and maintained at 160° for at least one hour and then it is cooled. The resultant product is a suspension of finely divided particles of pigmented nylon in aqueous alcohol. The pigmented nylon powder is separated by filtration and dried. The dried pigmented nylon is spun into colored nylon staple which is characterized by evenness of pigmentation.

Example IV exemplifies the process carried out in successive steps with the organic liquid employed in a succeeding step.

In all of the above examples other organic liquids and other aqueous suspensions of pigments may be used in lieu of the respective organic liquids and pigments mentioned, with analogous results.

It will be noted that the present invention provides a process for producing pigmented polyamides suitable for use in the manufacture of spun dyed polyamide fibers. The pigmented polyamide particles as such or blended with unpigmented polyamide can be spun into yarn of desired denier to produce uniformly colored yarn of any desired color or shade.

The present invention results in pigmented polyamides in finely divided form in which the pigment is finely dispersed throughout the finely divided polyamide particles with the polyamide in the outer phase. These finely divided pigmented polyamides can be produced having a high concentration of pigment to provide a master coloring batch for blending with uncolored polyamide to produce polyamides of the desired shade or color. Desired color effects may be produced by the blending of pigmented polyamide batches of different colors, providing the pigments of the different batches are compatible.

Since certain changes may be made in carrying out the above-described method of producing pigmented polyamide particles, without departing from the scope of the invention, it is intended that all matter contained in the above description shall be interpreted as illustrative and not in a limiting sense.

What is claimed is:

1. The process of preparing pigmented synthetic linear polyamides which comprises, heating a mixture containing an aqueous dispersion of a finely divided pigment, a synthetic linear polyamide, water and an organic liquid which conditions said polyamide so that it becomes molten at an appreciably lower temperature than would be the case in the absence of said organic liquid and is chemically inert, to said polyamide, said organic liquid being from the group consisting of monohydric aliphatic alcohols containing from 1 to 6 carbon atoms, alicyclic alcohols, polyhydric alcohols, ketones, and mixtures thereof, to a temperature at which said polyamide is molten but below the temperature at which the polyamide undergoes substantial decomposition and thus effecting the substantially complete transfer of the pigment from the aqueous phase into the molten polyamide phase, agitating and cooling the mixture to effect formation of solid pigmented polyamide particles, and separating the solid pigmented polyamide particles from the liquid.

2. The process as defined in claim 1 in which the heating of the mixture is carried out in an atmosphere chemically inert to the polyamide, and the mixture is heated to a temperature of 125° C. to 180° C.

3. The process as defined in claim 2 in which the organic liquid is cyclohexanol.

4. The process of preparing pigmented synthetic linear polyamides which comprises heating a mixture consisting essentially of a synthetic linear polyamide, an aqueous dispersion of a pigment containing from 0.001 part to 2.0 parts by weight of finely divided pigment per part of said polyamide, from 2 parts to 10 parts by weight of water per part of said polyamide and from 20% to 50% based on the weight of water of an organic liquid selected from the group consisting of monohydric aliphatic alcohols containing from 1 to 6 carbon atoms, alicyclic alcohols, polyhydric alcohols, ketones and mixtures thereof, in an atmosphere chemically inert to the polyamide, to a temperature of from 125° C. to 180° C., continuing said heating until the pigment is substantially completely transferred from the aqueous phase into the molten polyamide phase, while agitating said mixture, cooling it to form solid pigmented polyamide particles, separating the pigmented polyamide particles from the liquid, and drying them.

5. The process of preparing pigmented synthetic linear polyamides which comprises heating a mixture of an aqueous dispersion of a finely divided pigment, a synthetic linear polyamide and water to a temperature at which the polyamide is molten but below the temperature at which the polyamide undergoes substantial decomposition to effect the substantially complete transfer of the pigment from the aqueous phase into the molten resin phase, mixing an organic liquid from the group consisting of monohydric aliphatic alcohols containing from 1 to 6 carbon atoms, alicyclic alcohols, polyhydric alcohols, ketones, and mixtures thereof so that said organic liquid is admixed with said polyamide while the latter is in the molten phase and said pigments are dispersed in the molten polyamide phase, cooling the mixture of organic liquid and pigmented molten resin while agitating said mixture to form solid pigmented polyamide particles, and separating said solid particles from the liquid.

6. The process as defined in claim 5 in which the heating of the mixture is carried out in an atmosphere chemically inert to the polyamide, and the mixture is heated to a temperature of 125° C. to 180° C.

7. The process of preparing pigmented synthetic fiber-forming polyamides which comprises heating a mixture containing an aqueous dispersion of a finely divided pigment, a synthetic fiber-forming polyamide and a liquid selected from the group consisting of aliphatic and alicyclic alcohols and ketones having up to six carbon atoms to a temperature from 125° to 185° C. in an inert atmosphere, agitating said mixture, cooling said mixture and separating the resulting solid pigmented polyamide particles from the liquid.

References Cited by the Examiner

UNITED STATES PATENTS 2,345,533   3/1944   Graves _____ 260—37

MORRIS LIEBMAN, *Primary Examiner.*

DANIEL ARNOLD, ALPHONSO D. SULLIVAN, ALEXANDER H. BRODMERKEL, *Examiners.*

E. F. McKINNEY, G. C. HONEYCUTT,
*Assistant Examiners.*